(12) United States Patent
MacPhee et al.

(10) Patent No.: US 7,070,404 B2
(45) Date of Patent: Jul. 4, 2006

(54) COMPUTER-CONTROLLED COMPOUNDING EXTRUSION BLENDING APPARATUS AND METHOD

(76) Inventors: Daniel Joseph MacPhee, 3705 Alesia Kae Dr., Brunswick, OH (US) 44212; Christopher Mark Tanner, 1201 S. Eads St., #1811, Crystal City, VA (US) 22202-2845

( * ) Notice: Subject to any disclaimer, the term of this patent is extended or adjusted under 35 U.S.C. 154(b) by 627 days.

(21) Appl. No.: 10/279,939

(22) Filed: Oct. 25, 2002

(65) Prior Publication Data

US 2004/0080064 A1    Apr. 29, 2004

(51) Int. Cl.
*B29C 47/92* (2006.01)
(52) U.S. Cl. .................. 425/113; 425/149; 425/311
(58) Field of Classification Search .............. 425/113, 425/209, 311, 312, 313, 149; 366/141, 154.2, 366/163.1, 76.9, 76.3
See application file for complete search history.

(56) References Cited

U.S. PATENT DOCUMENTS

| | | | | |
|---|---|---|---|---|
| 4,066,245 A * | 1/1978 | Shultz | ........................ | 366/139 |
| 4,613,471 A * | 9/1986 | Harris | ........................ | 264/40.1 |
| 5,052,811 A * | 10/1991 | Akatsu et al. | .............. | 366/141 |
| 5,225,137 A * | 7/1993 | Sadr | .......................... | 264/349 |
| 5,240,324 A * | 8/1993 | Phillips et al. | .............. | 366/132 |
| 5,401,161 A * | 3/1995 | Long | ......................... | 425/563 |
| 5,792,495 A * | 8/1998 | Degady et al. | ............... | 426/5 |
| 6,261,081 B1* | 7/2001 | Speck et al. | ............. | 425/382.4 |
| 2001/0009307 A1* | 7/2001 | Abrams et al. | ............ | 264/40.5 |

FOREIGN PATENT DOCUMENTS

DE    19909307 A1 *    7/1998
EP     1128244 A2 *    6/2000

* cited by examiner

*Primary Examiner*—Duane Smith
*Assistant Examiner*—Emmanuel S. Luk
(74) *Attorney, Agent, or Firm*—Chris Tanner

(57) ABSTRACT

An extruder apparatus for compounding thermoplastic resin and reinforcing fibers is disclosed. Molten thermoplastic resin is mixed in intimate contact with long reinforcing fibers of at least one and one quarter inches in length under the control of a sophisticated computer system, resulting in charge ready for molding.

24 Claims, 16 Drawing Sheets

ANGLES OF OPERATION

COMPUTER-CONTROLLED COMPOUNDING EXTRUSION BLENDING APPARATUS AND METHOD

FIELD OF THE INVENTION

This invention relates generally to extrusion compounding of resin with reinforcing fibers under control of a computer. More particularly, an extruder apparatus and process for producing a preform charge suitable for subsequent use in a molding operation, such as compression molding, is disclosed.

BACKGROUND OF THE INVENTION

Fibers and resins are normally introduced together into a compounding extruder in a solid state. Upon first being converted from a solid to a liquid by a combination of motion, heat, friction, and pressure, thermoplastic resins have a relatively high viscosity, which contributes to fiber breakage as the resins are intermixed with the fibers in the extruder. Some compounding extruders introduce room-temperature fibers downstream of the thermoplastic resin input point in the compounding sequence. Doing so has the disadvantage that relatively cold fibers draw heat out of the melted resin, thereby raising the viscosity of the resin melt stream. The resulting, somewhat more viscous melt stream contributes to fiber breakage during the extruding process.

The foregoing problems and difficulties associated with prior art compression molding techniques would be eliminated if a molder could compound the thermoplastic molding product in-line with the preform-making equipment. Accordingly, the present invention is directed to an apparatus and method for compounding fibers with thermoplastic resins in an extrusion process where the fibers measure one and one quarter inches in length or greater.

BRIEF SUMMARY OF THE INVENTION

This invention has as its primary objective the compounding of thermoplastic resin with reinforcing fibers in such a way as to produce measured preform charge of a predetermined size, shape, and strength. This charge consists of discontinuous lengths of reinforcing fibers randomly dispersed in thermoplastic resin.

A further objective is to provide a blended mixture of thermoplastic resin with reinforcing fibers wherein the structural integrity of the discrete fibers is maintained in lengths preferably of one and a quarter inches or more. A further objective is to minimize the amount of stress-concentrating fiber ends.

A still further objective is to use an axially transient screw instead of an axially stationary screw, thereby lowering shear. A still further objective is to use a reciprocating screw instead of an axially stationary screw. A still further objective is to maximize wet-out of the molten mixture. A still further objective is to overcome problems associated with the natural angle of repose of glass cylinders through use of a closed-loop auger feeder responsive to a computer system.

These and other objects and advantages of the invention will become readily apparent as the following description is read in conjunction with the accompanying drawings.

DETAILED DESCRIPTION OF THE PREFERRED EMBODIMENTS

Practitioners of compression molding continually seek to produce molded parts with longer reinforcing fibers. The presence of long reinforcing fibers creates plastic parts with improved mechanical properties. The plastic raw materials utilized in compression molding vary from sheet, to bulk molding compounds, to pellets. The bulk molding compound (BMC) and the pellet products are usually first converted to a preform charge prior to molding, but not always. The preform charge may be any desired shape, such as a sheet or "log" type of member which is introduced into the chamber of the compression mold. The molding compounds are made up of at least two components, including a reinforcing fiber, such as glass or carbon, and a plastic resin. Various fillers and additives, as well as colorants may also be utilized in the molding compound. The plastic resin can be either thermosetting (requiring heat and pressure to increase molecular weight to form a solid substance), or thermoplastic (high molecular weight resins that require heat for melting and cold for solidifying).

The present invention comprises a low shear reciprocating compounding extruder and blending system that precisely weighs, mixes, compounds, and prepares resins, fibers, and other raw materials for molding. These raw materials can include virgin resin (plastic), long glass fibers, and additives, which are combined to form charge immediately suitable for molding. In the prior art compounding process, a molder would purchase precompounded composite materials in pellet form, and then run the pellets through a conventional extruder to produce charge, which is suitable for placing into a mold and being pressed into a finished part. In the system of the present invention, the charge is prepared on-line and upstream from the compression molding process, resulting in decreased material costs over traditional processes and a significant competitive advantage to the purchaser/licensee. This cost reduction is achieved by eliminating the traditional intermediate pelletizing step and the pellet-to-charge extruding mechanism previously required. Additionally, within the present invention, a blending system configurable to convey and precisely mix glass, resins, and other substances, is combined in-line with a reciprocating low shear extruder thereby enabling the production of charge having widely varying properties, as well as eliminating the pelletizing step of the prior art.

Figure 1:
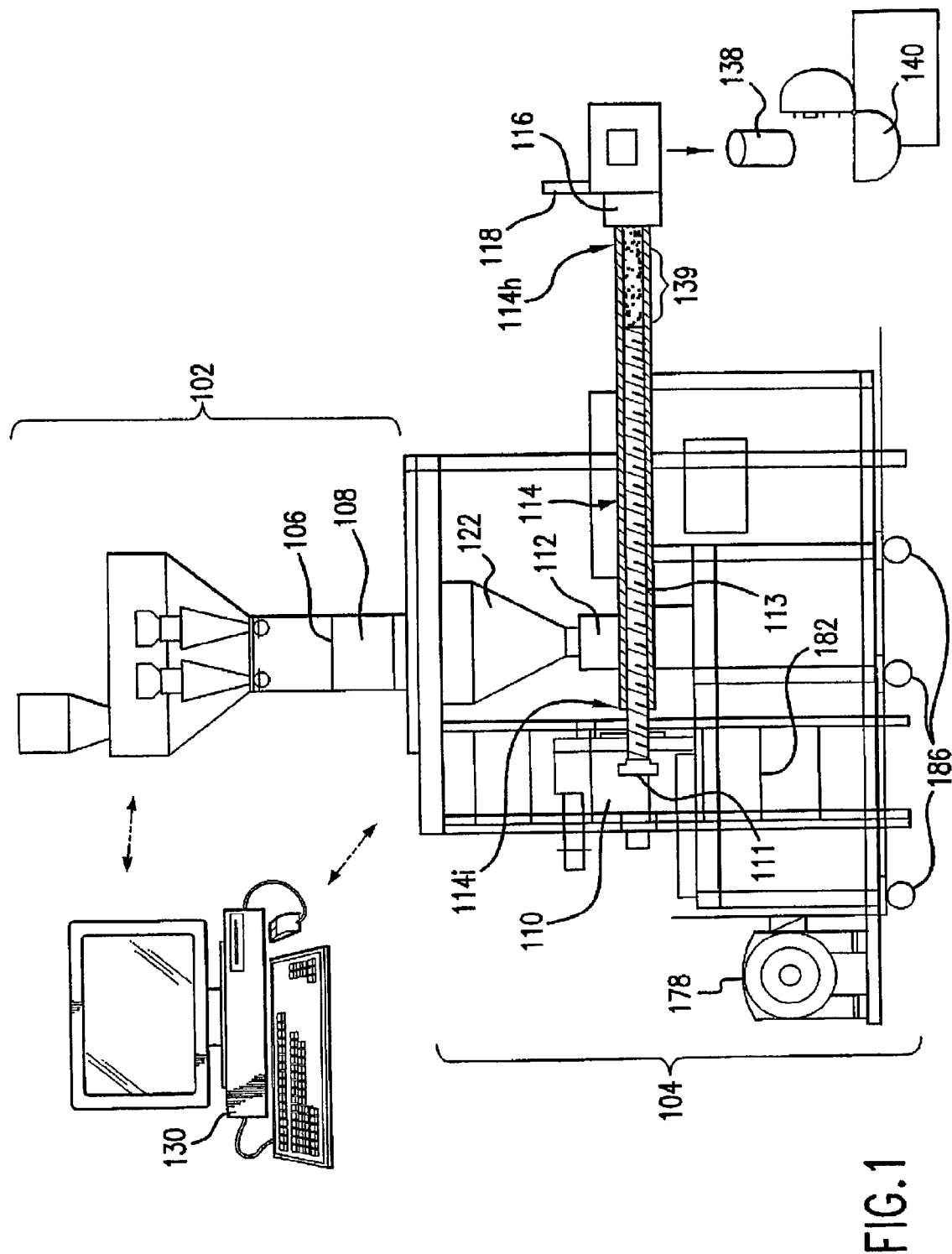
FIG. 1 is a side elevation view of the blending system and reciprocating extruder of the present invention.

FIG. 1 shows a blending system 102 combined in-line with a reciprocating extruder 104. The blending system 102 has a washpan 106, mover 108, and numerous hoppers. The reciprocating extruder 104 has an extruder hopper 122 having a throat 112 through which flows the raw materials previously blending by the blending system 102. The entire assembly can be accessed by a ladder 111 and can be laterally moved through wheels 186.

The extrusion system 104 has an elongated, rotatable mechanical screw 113 contained within the barrel or housing 114. The barrel 114 has an inlet end 114$i$ and a head end 114$h$. The screw 113 extends lengthwise through the barrel 114 between the motor 110 and a head end of the extrusion system 104. Power screw 113 is driven by a motor 110 having a variable transmission 111 in two way communication with a computer system 130. A variable pressure auto shut-off pop valve 116 is located between the head 120 of extruder 104, and a knife assembly 118 serves to cut off the extruded charge 138 for use by a molder 140. Pressure within the barrel 114 is maintained by the compressor 178. The mechanical action including friction generated by power screw 113 on the resin pellets, coupled with the heat from heater bands 117 attached to the barrel 114 serves to melt the extrudate 139 located therein. For clarity, material still within the barrel 113 will be referred to as extrudate 139, but upon being ejected and cut from the extruder 104 will then be referred to as charge 138.

Figure 2:
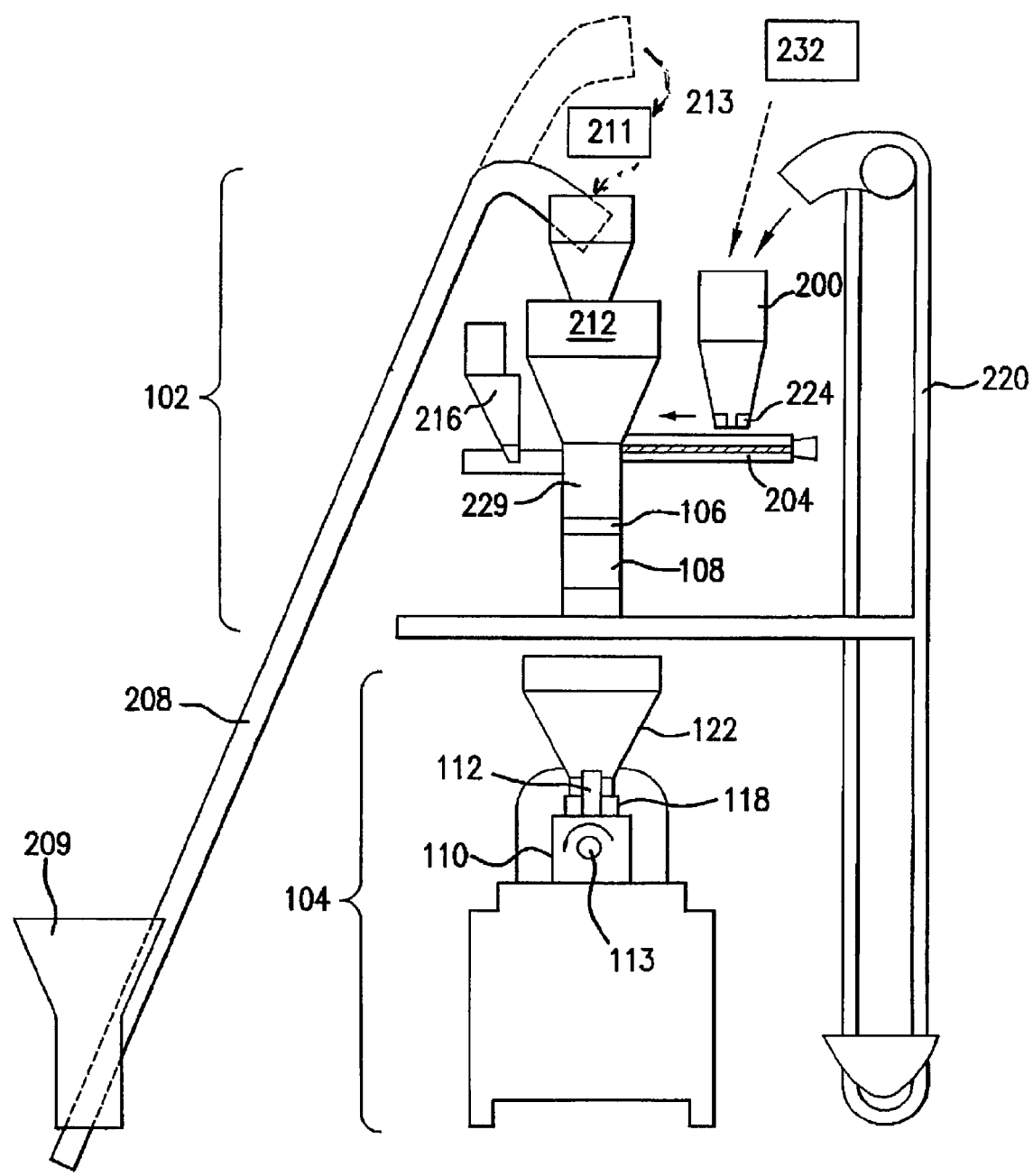
FIG. 2 is a front elevation view of the apparatus of FIG. 1.

As shown in FIG. 2, a vacuum loader 208 is connected to resin-pellet container 209 and serves to draw resin pellets from container 209 them, if necessary, into a thermoplastic dryer 211 prior to compounding. Most materials do not need drying, but some do, such as hydroscopic materials. Therefore, as shown in FIG. 2, an alternate path 213 is used by materials requiring drying. The different paths are selectable using computer system 130.

Figure 7:
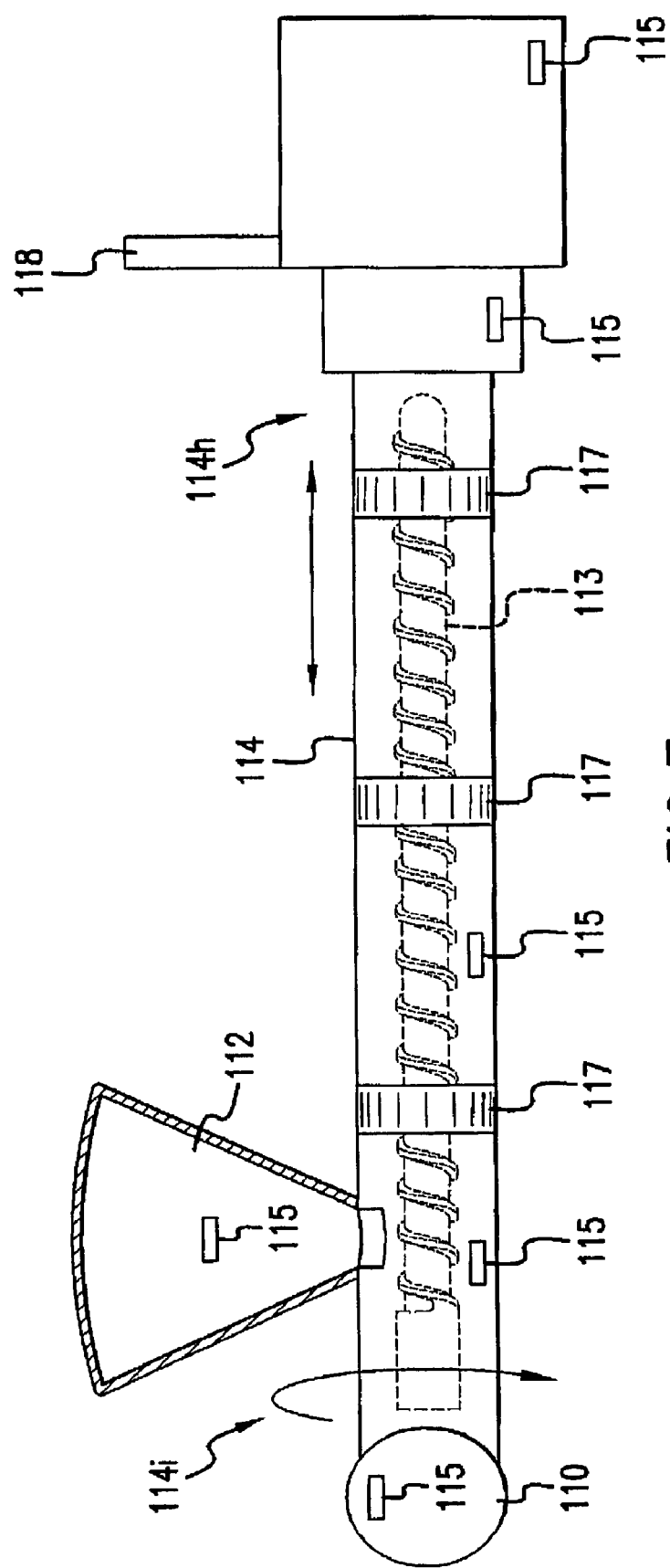
FIG. 7 is a diagram of the direction flow of the extrudate during the compounding process of the present invention (copy and update FIG. 1)

The screw speed desirable for melting the resin is not necessarily the screw speed which would be most effective for compounding the resin and glass cylinders. Consequently, computer system 130 monitors the relative temperature and pressure within barrel 114 via sensors 115 located throughout the extruder mechanism, as shown in FIG. 7. Using sensors 115, computer system 130 monitors and adjusts the speed, torque, and temperature of motor 110 as well as the temperatures within the barrel 114 using heater bands 117.

FIG. 2 shows virgin resin and additives being vacuum conveyed up to the hoppers 200, 212 which are positioned above a weigh pan 106 and mixing chamber 108. The long glass fibers, originally packaged in cylinders measuring ~5 inches long with a diameter of ~1.5 inches, are conveyed to a hopper 200 adjacent to the resin and additive hoppers via a mechanical elevator 220. The glass cylinders are packaged with a sizing coating in order to preserve fiber length. This chemically neutral sizing coating is rendered inert and then eliminated during the compounding process. The elevator 220 is specially designed to eliminate "bridging" (clogging) inherent to the fiber cylinders materials because of their natural angle of repose.

Through computer-controlled slide gates 224, a predetermined dose of resin and additive is consecutively gravity-fed into weigh pan 106. This portion of the blending system 104 facilitates precise dispensing of the glass via a closed-loop auger feeder 204 controlled by computer system 130, which moves the glass cylinders from the hoppers to the weigh pan 106. As with screw 113, the computer system 130 monitors and adjusts the speed, torque, and temperature of auger 204 and weigh pan 106 for continuous feedback and adjustment. Thus, the relative volumes of the resin and fibers are closely controlled by computer system 130 in order to produce the composite product most closely resembling the characteristics desired by the end-user or customer.

A particularly beneficial aspect of the compounding process and apparatus resides in the weight-controlled supply of thermoplastic resin and fibers to the compounding extruder 104. The aforesaid closed loop auger feeder 204 comprises weighing and conveying apparati arranged to feed thermoplastic resin pellets into the resin extruder inlet end 114$i$ at an adjustable rate weight, again responsive to computer system 130. The reinforcing fiber cylinders are weight-controlled in order to carefully monitor and control the weight rate at which the fiber cylinders are fed into the compounding extruder.

Additionally, to improve the precision of loads provided to chamber 228, a vibration feeder 232 can also be combined with computer-controlled slide gates 224, as shown in FIG. 2. The combined materials are then either gravity or force-fed to a chamber 108 directly below weigh pan 106 for further mixing, and again either gravity or force-fed to the throat 112 of extruder 104, which is in turn located directly below mixing chamber 108. Further, a rotating arm can be added to chamber 108 in order to ensure that all combined materials properly advance to throat 112, and to feed back to computer system 130 whether throat 112 has been cleared or not.

Figure 3:
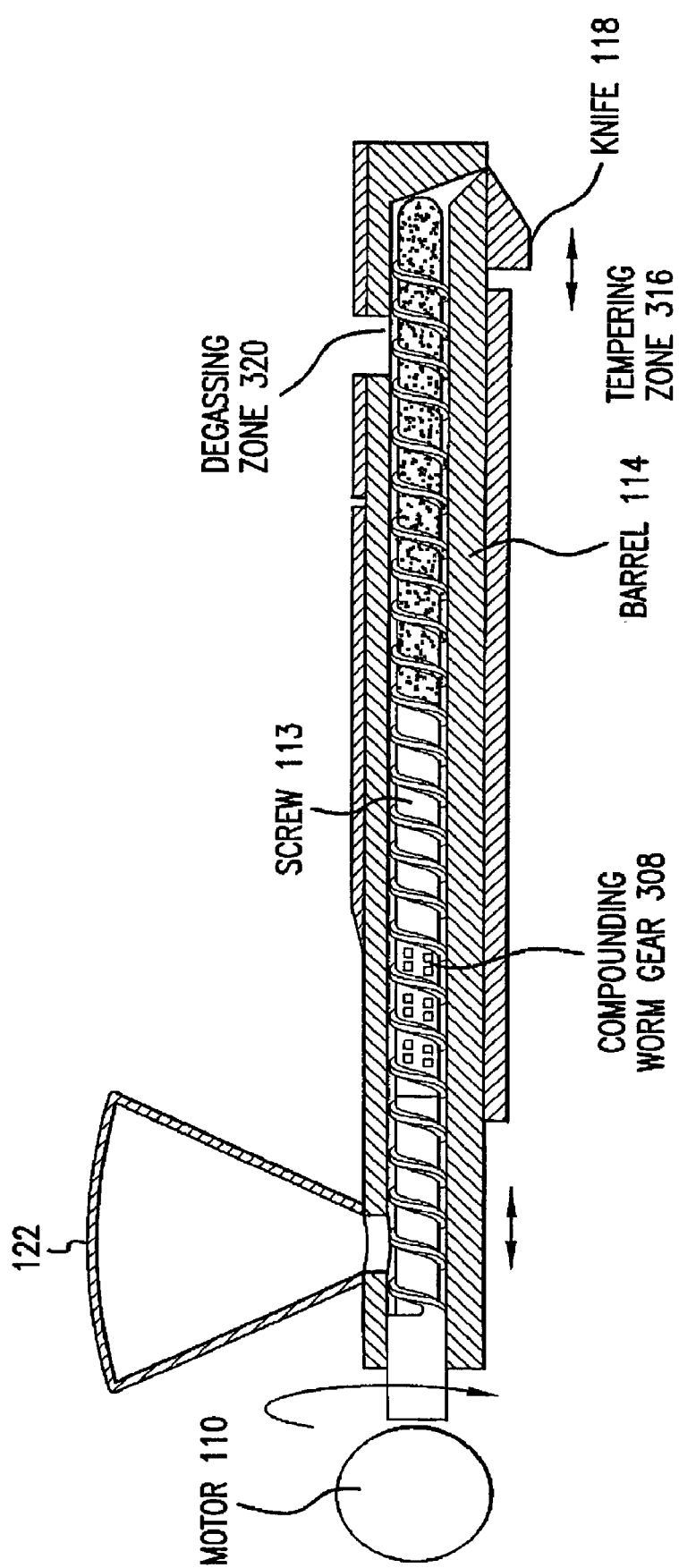
FIG. 3 is a side view of a screw/barrel assembly of the present invention.

As shown in FIG. 3, the extruder 104 consists of a low shear barrier screw 113 inside a heated barrel 114, where the screw 113 can retract into the barrel 114 via head pressure generated by the extrudate melt stream that is conveyed toward the head 120 of the barrel 114 and against a knife 118 that acts as a barrier to the flow of materials produced by the natural pumping action of screw 113. To avoid backflush and control mixing of the extrudate melt stream, a variable-pressure auto-shutoff pop valve 116 is installed on screw 113. The temperature and pressure at which the auto-shutoff pop valve 116 is activated can be adjusted at computer system 130. This has the advantage that compounding extruder 104 can compound a more diverse variety of materials having different temperature and pressure compounding requirements. A compounding worm gear 308 assists in adjusting the pressure within the barrel 114. Gases resulting from the compounding process escape through the degassing zone 320.

Figure 3A:
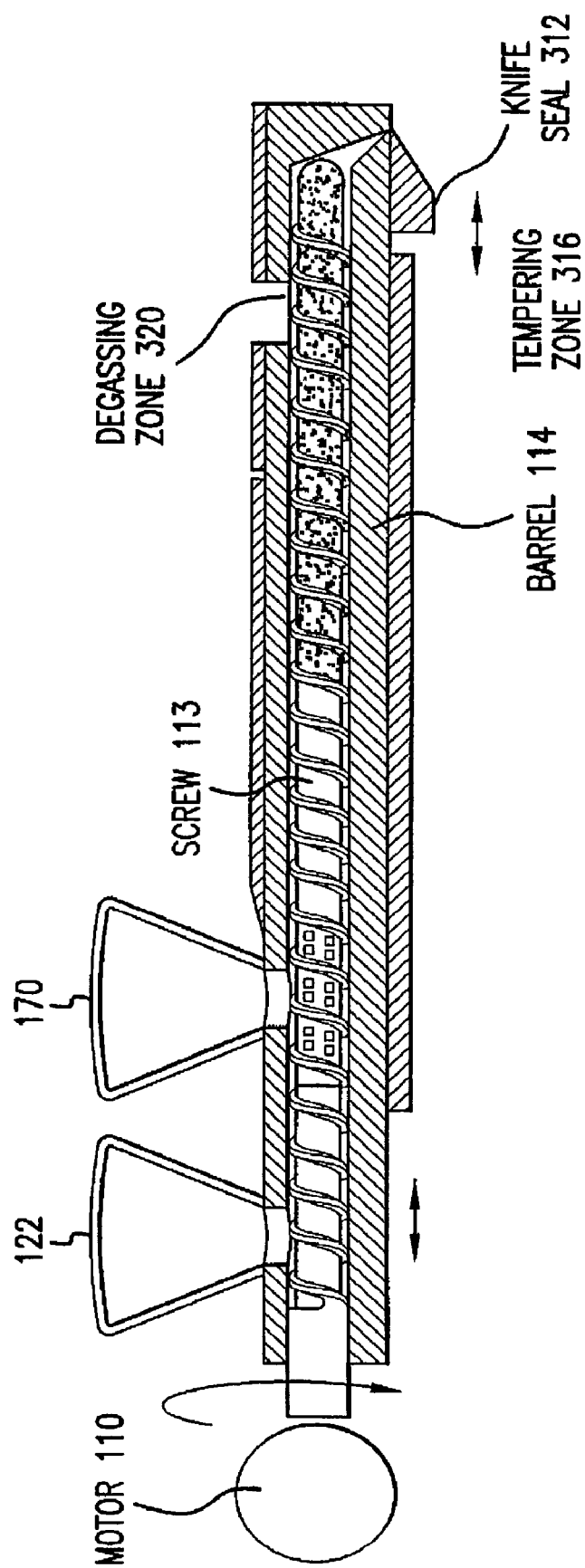
FIG. 3A is a side view of a screw/barrel assembly of the present invention.

FIG. 3A shows a variation on the mechanism of FIG. 3, in which a second hopper 170 is provided. The temperature of the barrel 114 can differ between hoppers 122 and 170.

Figure 4:
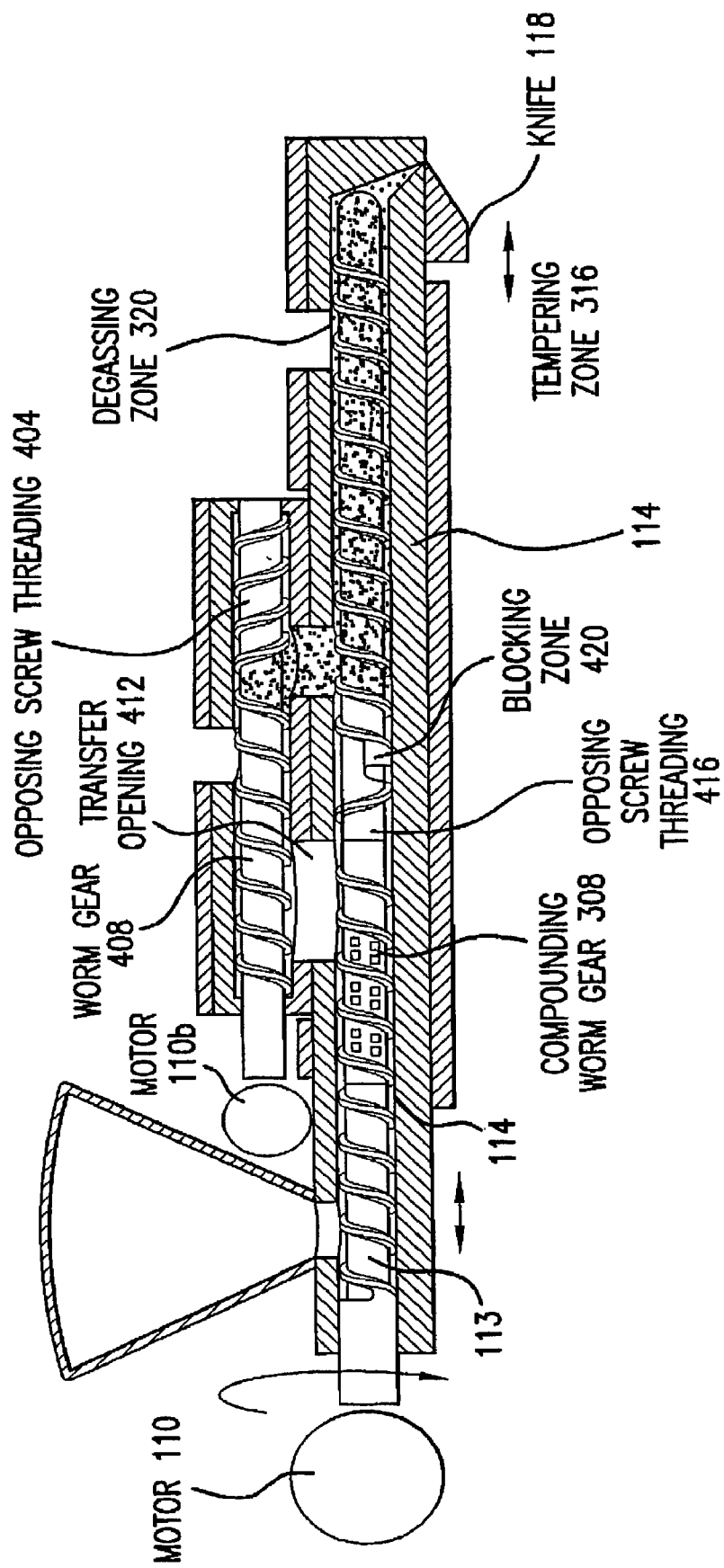
FIG. 4 is a side view of an alternative screw/barrel assembly of the present invention.
Figure 4A:
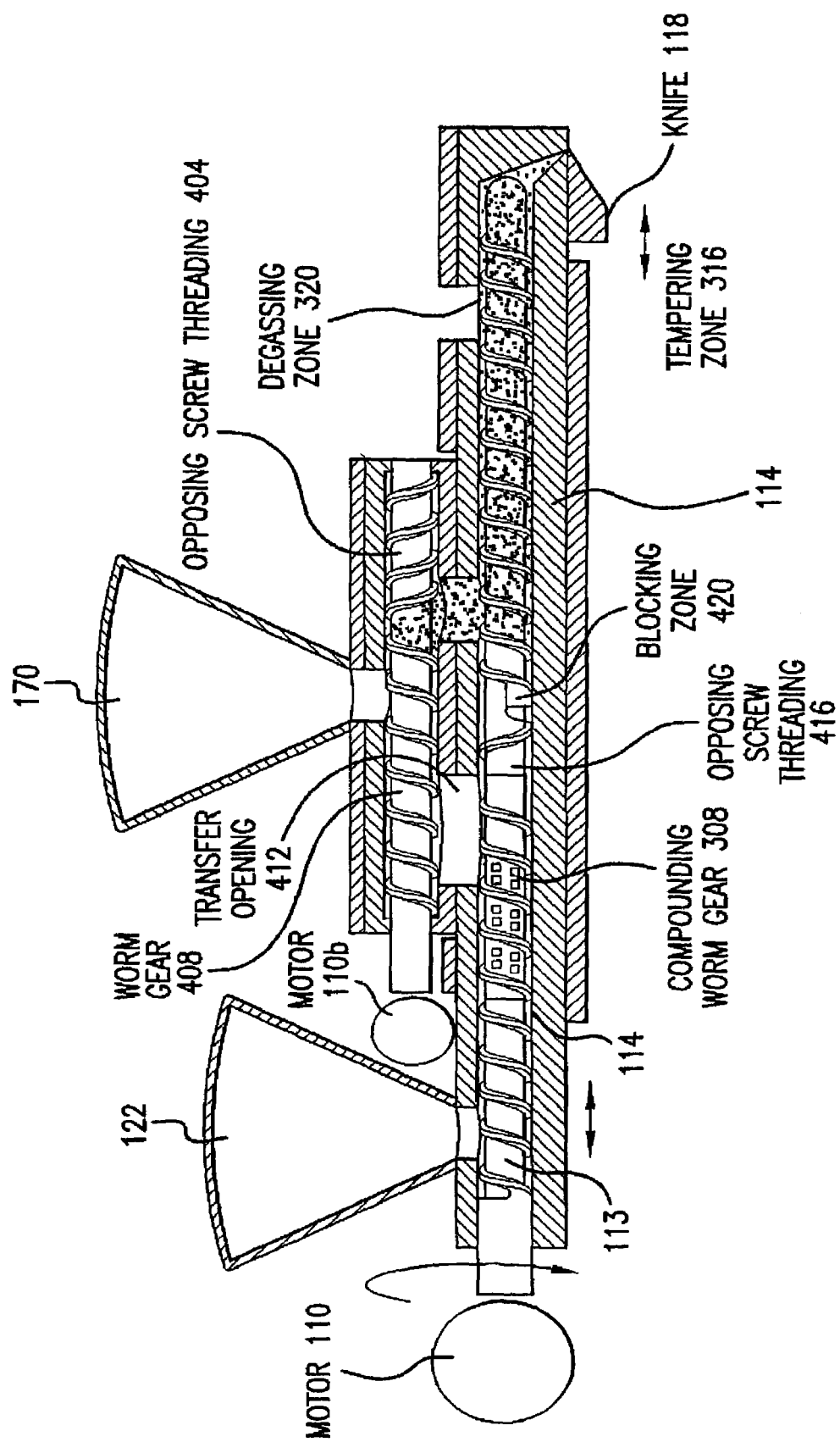
FIG. 4A is a side view of an alternative screw/barrel assembly of the present invention.

FIG. 4 shows a slightly modified version of the extruder 104 and screw 113 of FIG. 3. In FIG. 4, the screw 113 is actually two upper and lower screws 113$a$ and 113$b$ respectively, with two motors 110$a$ and 110$b$, and two barrels 114$a$ and 114$b$. The opposition threading 416 and blocking zone 420 forces the extrudate 139 up a transfer opening 412 to be further worked by the upper screw 113b, the barrel of which can be a different temperature than the lower barrel 114a. When the extrudate 139 has reached a predetermined condition (either wet-out, pressure, temperature, or a combination thereof) it is then moved back down to the lower barrel 114a, where it is compounded and extruded, and where the reciprocating screw 113a pushes out the finished charge 138. The extrudate 139 is worked through the upper and lower barrels 114a and 144b by the screw threadings 404 and 416, which are arranged in opposing directions. FIG. 4A also shows a variation on the mechanism of FIG. 4, again in which a second hopper 170 is provided.

Figure 5:
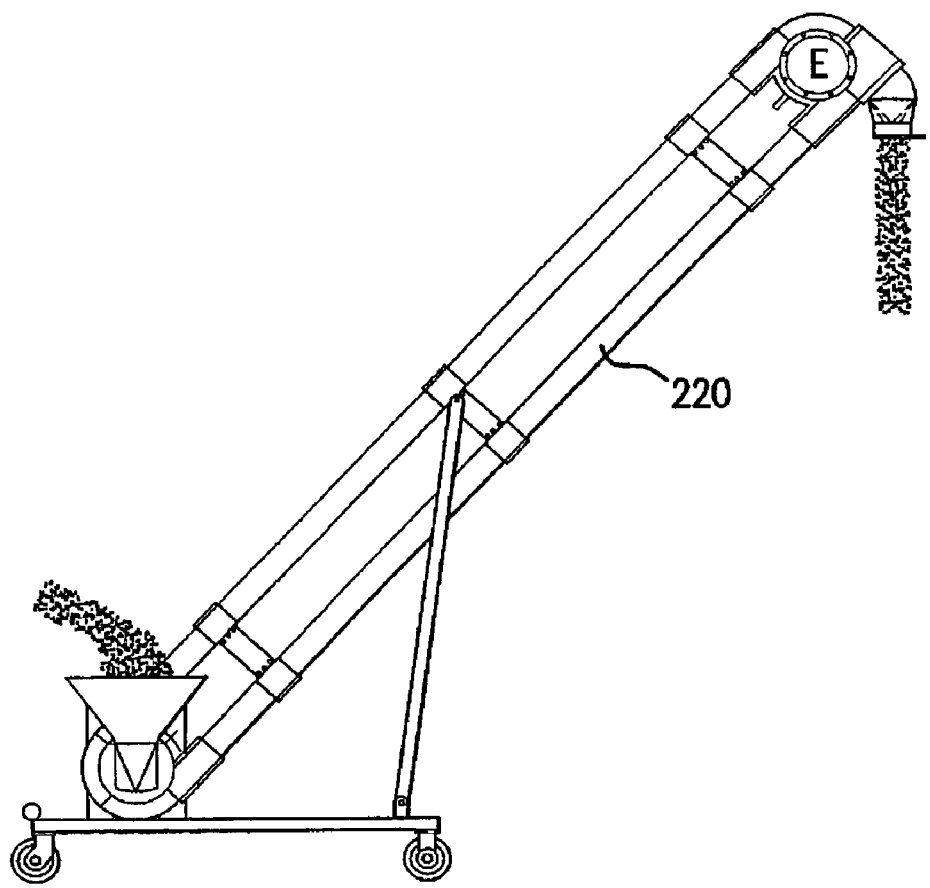
FIG. 5 is a side view of a feed mechanism used within the present invention.
Figure 6:
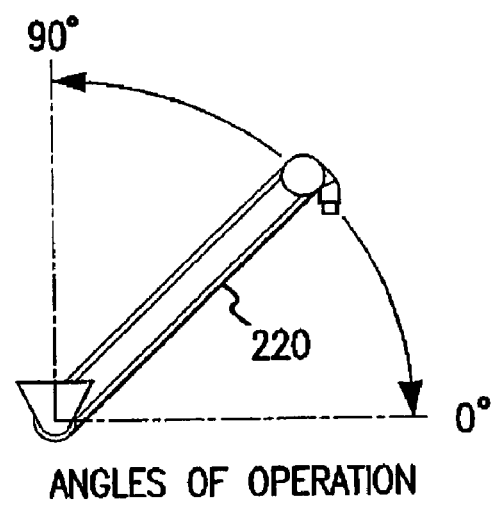
FIG. 6 shows the range of motion of the feed mechanism of FIG. 5.

FIG. 5 is a side view of an elevator feed mechanism 220 used within the present invention. FIG. 6 shows the range of motion of the feed mechanism of FIG. 5. As stated, the elevator feed mechanism 220 assists in preventing the glass cylinders from clustering or improperly bundling due to their unique angle of repose. In a preferred embodiment, the elevator 220 can consist of a Portable Aero-Mechanical Conveyor made by Entecon Conveyer Systems and sold by Spiroflow-Orthos Systems of Monroe, North Carolina although other systems are also contemplated within the present invention.

As shown in FIG. 7, the closed loop auger feeder 204 is controlled by computer system 130 so as to permit the feeding of reinforcing fibers at a desired weight rate through either a cram, gravity, or vibration feeder 232. The computer system 130 receives and reacts to signals from weigh pan 106 and slide gates 224. The computer system 130 also controls the speed of vacuum conveyor 208, mechanical elevator 220, as well as, where applicable, the frequency of the vibration feeder 232. Computer system 130 is initially programmed to provide the predetermined formulation of resin and fiber, e.g., 60% resin and 40% fiber by weight in the charge 138, as well as to control the desired total weight input of fiber and resin in pounds per time interval. Extra hoppers and colerants can be combined within auger feeder 204, thereby increasing flexibility and user-customization of the present invention.

Conventional extrusion mechanisms typically have a "head" assembly which usually contains breaker plates, die adapters, head adapters, and screen packs. To dissemble the barrel it is necessary to take all of these things off. In the present invention, it is only necessary to take the knife off as there is no "head" per se, only a head-end of the barrel 114. As stated, typical extruders have a screen pack located in the head. A screen pack is similar to a filtering system that goes in between the end of a barrel and the head of the die. The screen pack creates head pressure which makes a more consistent flow come out of a traditional extruder, so as to prevent surge and pulsing, which in turn holds the mass flow rate of the extrudate 139 at a stable level.

The present invention avoids the necessity of having a screen pack. Extruders with screen packs could not produce charge with glass fibers in the sizes contemplated by the present invention. The present invention solves the problem of surging and pulsing in a different way, in that it is not run continuously. In other words it's not a continuous operation, it's a reciprocal operation. In a traditional extrusion process, the screw is constantly rotating at a consistent speed and pressure. Thus, the charge that is extruded out has a very consistent geometry. The present invention, however, creates head pressure and the head pressure pushes the screw 113 back. Then the knife 118 opens up and the screw 113 pushes out the charge 138. The geometry is still consistent, but a much wider spectrum and variety of geometries can be achieved.

Because the present invention does not have a conventional "head" mechanism, it can be more quickly modified to accommodate changes in load composition. All sensors 115, auto shut-off pop valve 116, and knife 118 can be removed for cleaning and flushing excess materials from extruder 104. Additionally, sensors 115 can be either directly wired to computer system 130 or be of a wireless variety, communicating remotely with the computer system 130 or via a wireless IR relay. Because these sensors contain their own power cells, no wire leads are necessary to communicate with computer system 130. This is an advantage when cleaning and disassembling the extrusion system 104 in preparation for new loads, as wire leads and attachments tend to wear out quickly due to the high temperatures and harsh environment inherent within the compounding/extruding process. Additionally, the sensors 115 are made from a corrosion-resistant type of plastic, which is useful for withstanding the effect of high heat and chemicals necessary to clean and flush the barrel 104 in preparation for new loads.

When a load of new material is desired, it is then necessary to purge into the barrel 114. To do so, an operator loads a neutral, inexpensive purging compound in the blending system 102 and then the extruder 104, which acts to clean out the barrel 114. It is necessary that there is always material in the barrel 114 because, barring a time-consuming cleaning process, other material is needed to push out the existing extrudate 139.

It is sometimes necessary to pull the screw 113 if a purging compound fails to remove a degraded extrudate 139 hung up in the barrel 114 and knife 118. Suppose an operator ran a material that melts at 400–450 degrees and now that customer wants to run nylon, which melts at ~550 degrees. All materials have a window of proper melt temperatures that, if exceeded, will degrade the molecules and break the polymer chain. This will result in turning the degraded material into a foreign substance like black specks or charcoal. Such a material can hang up in the barrel 114 and interfere with the flights and threads of the screw 113. These specks may slough off into the charge 138, causing contaminants to be molded into a resulting part which would create stress concentrators thereby weakening the part. Also, the knife 118 occasionally gets extrudate 139 jammed therein which can solidify and cause the knife 118 to seize.

To overcome these and other problems, the first choice is to purge out the contaminating material. And if it can't be purged out, pulling the screw 113 and cleaning out the barrel 114 with a putty knife is necessary, because only then is it possible to run higher temperature material. To clean the barrel 114, it is necessary to scrape the barrel with a putty knife while under heat.

One advantage of the present invention, however, is that the fiberglass products utilized therein are inherently abrasive so that the glass fibers act as bristles of a brush to repeatedly clean the barrel 114. Thus it is less necessary to take the barrel 114 apart, because as stated it is desired to avoid doing so. However, in those instances where it is necessary, another difference between the present invention and prior art is that the present invention has no "head" attached, only a head end. Thus a user of the present invention can open up the knife 118, disconnect the screw 113 in the back and push the entire mechanism apart with minimal effort. If a sizing die is attached, that can also be easily removed. The dual-screw embodiment of FIG. 4 is somewhat of an exception to this.

The purpose of a sizing die is to set the exit diameter of the barrel 114. A sizing die creates a transition from the internal diameter of the barrel to the desired output diameter of the charge 138. Then the operator would take the charge and place it in the tool or the cylinder for the transfer molding and then squirts it into a mold cavity 140 having the desired geometry for forming specific parts. If the charge 138 is too big for the mold cavity 140, that's bad because charge is then wasted. A sizing die prevents such waste.

Additionally, a barrel extension is sometimes used for increasing the size of the barrel 114 to have a length/width ratio of 20:1 and in some cases 24:1. However, to add a barrel extension it is necessary to remove the knife 118 as well as other parts. A barrel extension works similarly to putting a leaf in a table, in that barrel extensions have threaded surfaces and flanges to attach to the original barrel. Extrusion systems of the prior art having with head ends and die adapters have a much more difficult time adding barrel extensions. After bolting the extension and attaching a longer screw, a wider variety of materials can be run. This is valuable because some materials have more difficulty wetting out the fiberglass and thus require a longer barrel. Because of the economy of features of the present invention such as the lack of a complicated head assembly, sizing dies and barrel extensions can be added more easily.

It is also possible to vary the temperature at which the barrel is heated. The barrel 113 can have multiple zones where each zone would have one or two heater bands. The computer system 130 heats the bands up which transfers conductively the heat into the barrel which then heats up the inside of the barrel. A thermocouple senses the temperature of the steel, so that the heater bands are turned on by electricity and the thermocouple sensing the temperature, where it is desired to slowly creep up to the desired temperature to avoid overheating. In other words gradually increase the temperature of the barrel going from the inlet end 114i to the head end 114h of the extruder 104. For example, it is sometimes desired to reduce temperature at the head end 114h in comparison with the inlet end 114i.

As stated, screw 113 not only rotates, but also reciprocates back and forth along the length of extruder barrel 114, as indicated by the directional arrows in FIGS. 3 and 7. In operation, the rotational movement of extruder screw 113 forces molten extrudate 139 towards the head end 114h of the barrel 114, resulting in head pressure which increases until it exceeds the back pressure of the screw 113. As extrudate 139 moves through the screw 113 and begins to build up within the head end 114h, the screw 113 moves back towards the inlet end 114i, which results in lower shear mixing. This is because the screw 113 responds to pressure in the head of the extruder barrel 114 and withdraws at a predetermined pressure ratio controllable by computer system 130. Because shear is directly proportional to head pressure, it is desired to reduce head pressure yet still achieve sufficient temperature to properly melt the extrudate 139. Reducing shear assists in maximizing aspect ratio retention and minimizing the amount of stress-concentrating fiber ends in the resulting charge 138. To achieve this result, both head and back pressure thresholds can be adjusted at computer system 130, which receives pressure and temperature information from sensors 115.

Figure 8:
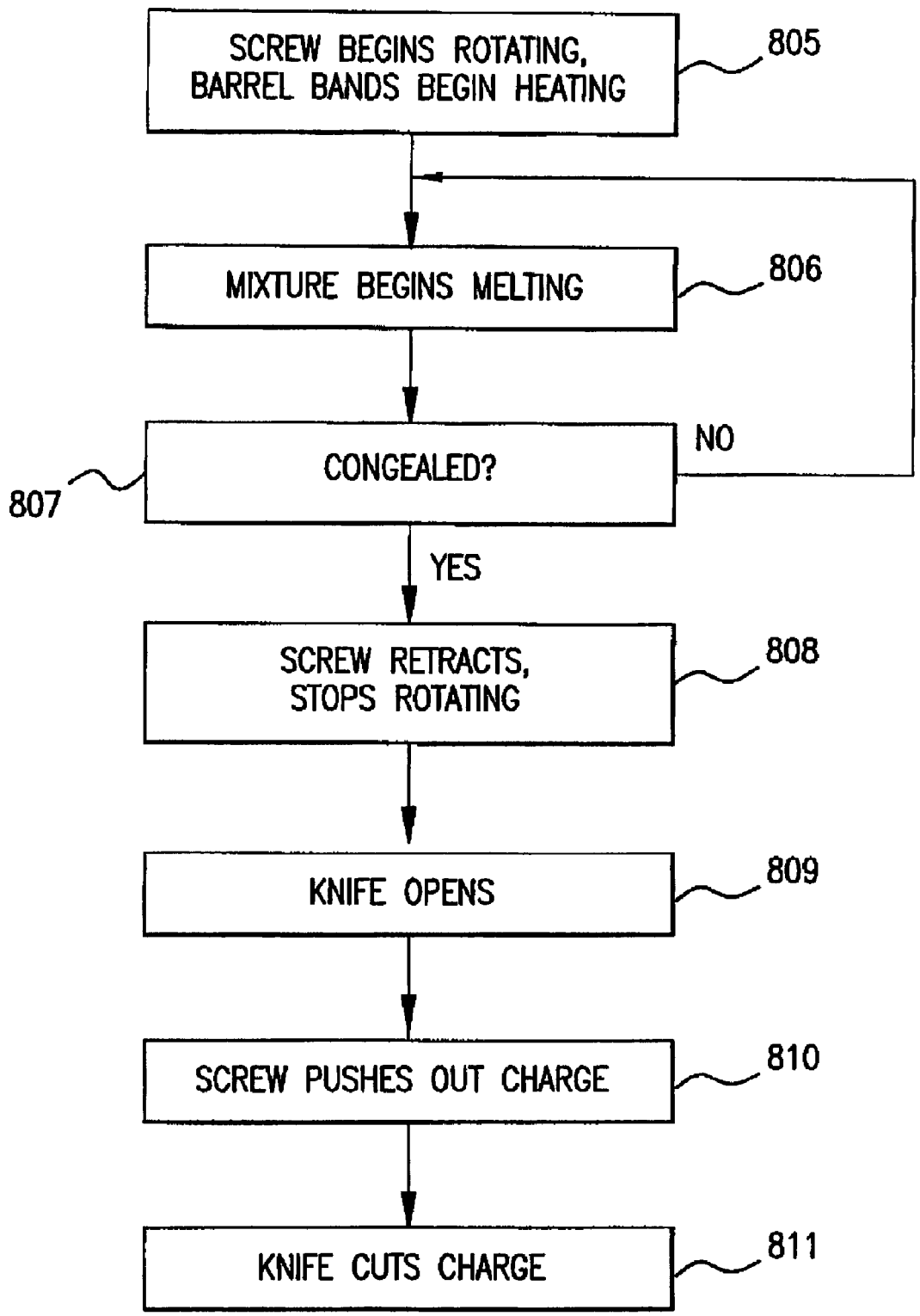
FIG. 8 is a flowchart detailing various steps performed within the present invention.

As shown in FIG. 8, regardless of which type of screw configuration is used, the screw 113 operates on the blended extrudate 139 as follows. In step 805, the screw 113 starts rotating, thereby pumping blended extrudate 139 forward toward the head end in the direction shown by the arrow 850, while the knife 118 remains in the down, closed position. In step 806, the extrudate 139 begins to melt because of heat transfer and a carefully controlled but minimal amount of mechanical shearing.

In step 807, the extrudate mixture 139 congeals into a homogeneous molten melt stream at low shear, thereby advantageously maximizing "wet-out" and minimizing fiber attrition, both of which are desired mechanical properties. Minimizing fiber attrition contributes to minimizing stress-concentrating fiber ends, which as stated are undesired properties. Step 808 ensures that the knife 118 remains down, thereby generating sufficient pressure to cause screw 113 to retract (again reducing shear) to a predetermined location and stop rotating.

In step 809, the knife 118 opens. In step 810, the screw 113, still not rotating, moves forward to push out the compounded charge 138; and then in step 811, the knife 118 lowers and cuts off the charge 138 in sizes and quantities previously selected by a user and stored in computer system 130.

It is worthwhile to note that a pressure sensor 115, located near knife 118 as shown in FIG. 7, is linked with computer system 130 so that the pressure which ultimately causes screw 113 to retract can be responsive to specific material characteristics desired by a user. The fibers within the charge 138 discharged from compounding extrusion system 102 are preferably of a length greater than one and one quarter inches, thereby providing maximum mechanical strength enhancement and aspect ratio retention to articles which are molded therefrom.

In an environment in which the resin has a lower melting point than the glass, the following alternative embodiment is proposed, as shown in FIGS. 3A and 4A. The glass cylinders are heated and mechanically worked by power screw 113 along the inlet end 114i of extruder 104 before coming into mixing contact with the plastic resins, which are introduced upstream at a separate resin inlet 170. Thus the glass cylinders are still heating up while the resins, having a lower melting point, are already melting. As a result, the penetration and coating (wet-out) of the individual filaments making up the strands or bundles of each length of fiber is greatly enhanced. Also, since the glass fibers will have been preheated along the inlet end 114i of the extruder 104, they will not cool the heated resins, and therefore will not increase the viscosity of the molten extrudate 139. This is useful because the higher the viscosity of the thermoplastic resin, the greater the propensity for degradation and breaking up of the reinforcing fibers. As stated, the prior art devices have the disadvantage of mixing relatively cold glass fibers, which has the effect of drawing heat out of the melted resin thereby raising the viscosity of the resin melt stream. The resulting more viscous melt stream contributes to fiber breakage during the extruding process. This is unwanted because the more fiber breakage that occurs, the greater the likelihood of stress-concentrating fiber ends appearing in the resulting charge 138. The present invention overcomes these problems by preheating the glass fibers at the inlet end 114i.

As noted above, the extrudate mixture of molten thermoplastic resin and discrete lengths of reinforcing fibers discharged from compounding extruder 104 may be directed into a preforming device 140, as shown in FIG. 2. The preforming device 140 may take various forms, depending upon the particular type and shape of charge 138 desired for a molding operation. If a log or billet-shaped charge 138 of generally cylindrical shape is desired, an extruding preformer comprised of a barrel or housing and having a power screw may be utilized. Such a preformer is provided with a drive unit comprising a motor and a power transmission for providing rotary power to screw as well as reciprocal movement.

As stated, this charge 138 is then utilized in a compression-molding process wherein the charge from the compounding extruder can be fed either directly into a molding cavity 140 of a compression molding machine as shown in FIG. 1, or a performer as described above. Additionally, in a preferred embodiment, compression molding machine 140 is also responsive to computer system 130, resulting in greater coordination of workflow and processes associated with blending, extruding, and molding.

Figure 9A:
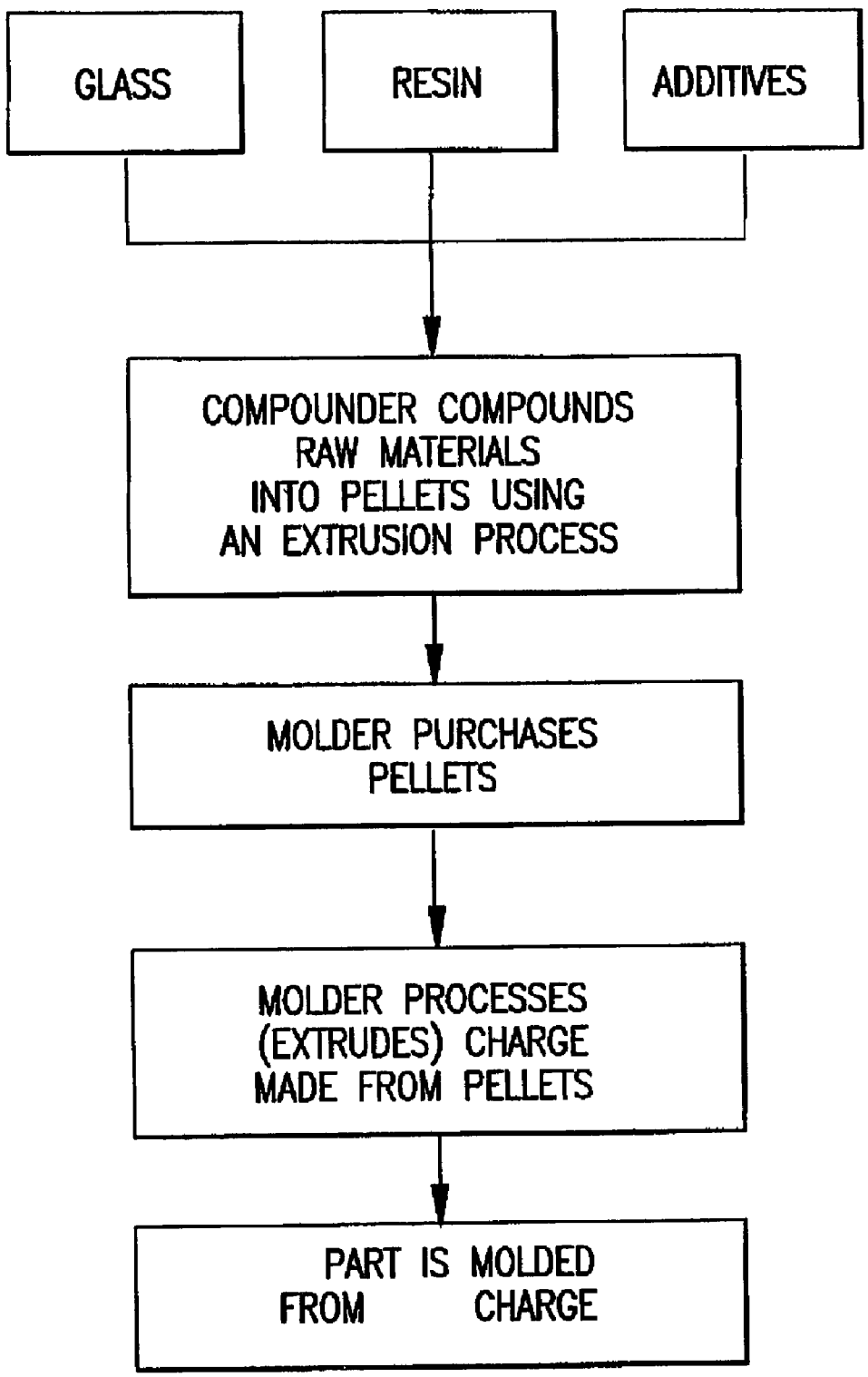
FIG. 9A is a flowchart showing a conventional blending/extruding process.
Figure 9B:
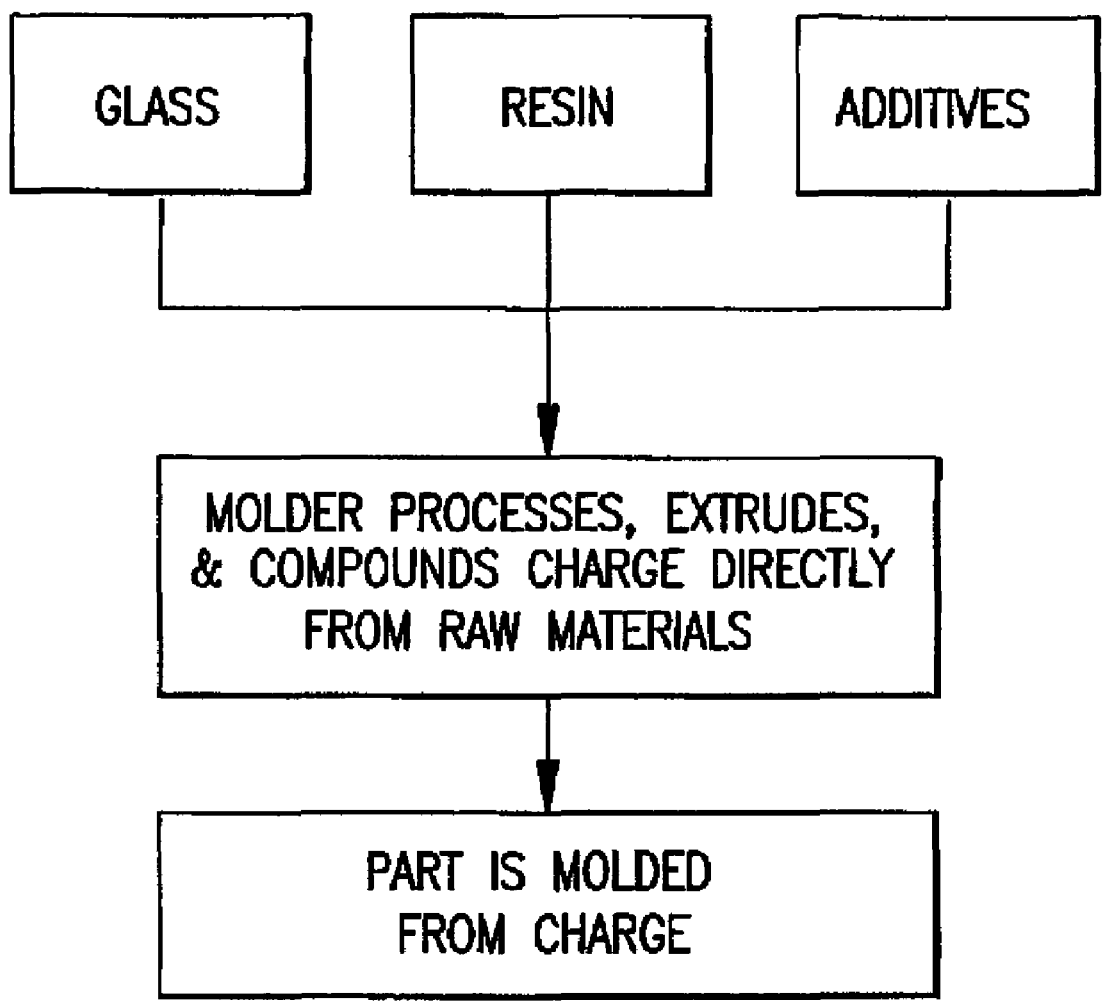
FIG. 9B is a flowchart showing the blending/extruding process of the present invention.

FIG. 9A shows a conventional blending/extruding process. FIG. 9B shows that the step of forming pellets is eliminated entirely within the present invention. Accordingly, the molder's raw material costs are significantly reduced, since it is not necessary to purchase, ship, and store precompounded pellets or sheet. Instead, the compounding takes place on the molding site as a continuous operation. The system of the present invention is also flexible in that the reinforcing fiber content can be varied as desired by the customer through use of the computer system 130.

Figure 10:
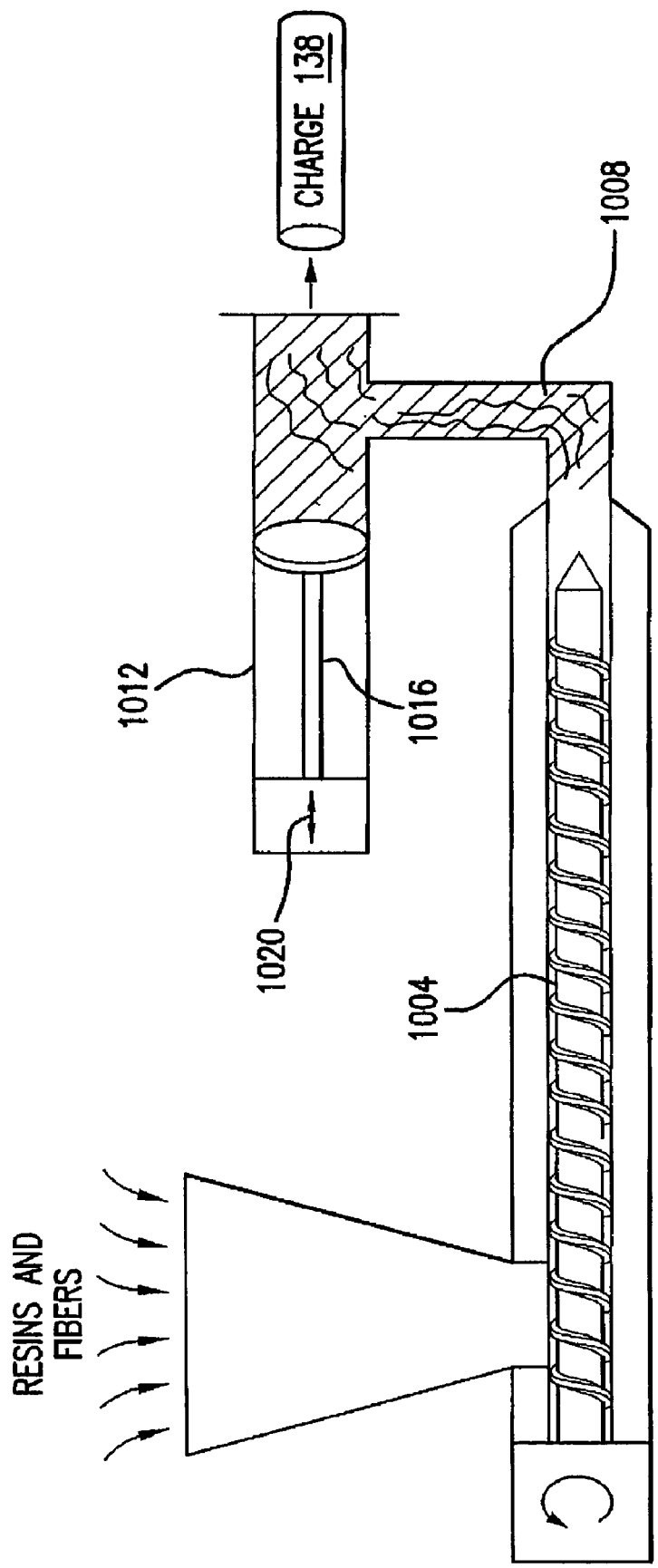
FIG. 10 is a diagram of an extrusion process of the prior art.

FIG. 10 shows an axially stationary screw 1004 as is known in the prior art, having a manifold 1008 and a plunger 1016. The manifold 1008 results in fiber breakage and increased shear, both which are exacerbated by the plunger 1016, which is operated by a motor 1020. This results in high-shear, disbursive mixing. Conversely, the reciprocating, axially transient screw 113 of the present invention provides distributive not disbursive mixing which assists in lowering shear and reducing the amount of fiber breakage. This in turn reduces the amount of stress-concentrating fiber ends appearing in the resulting charge 138.

Figure 11:
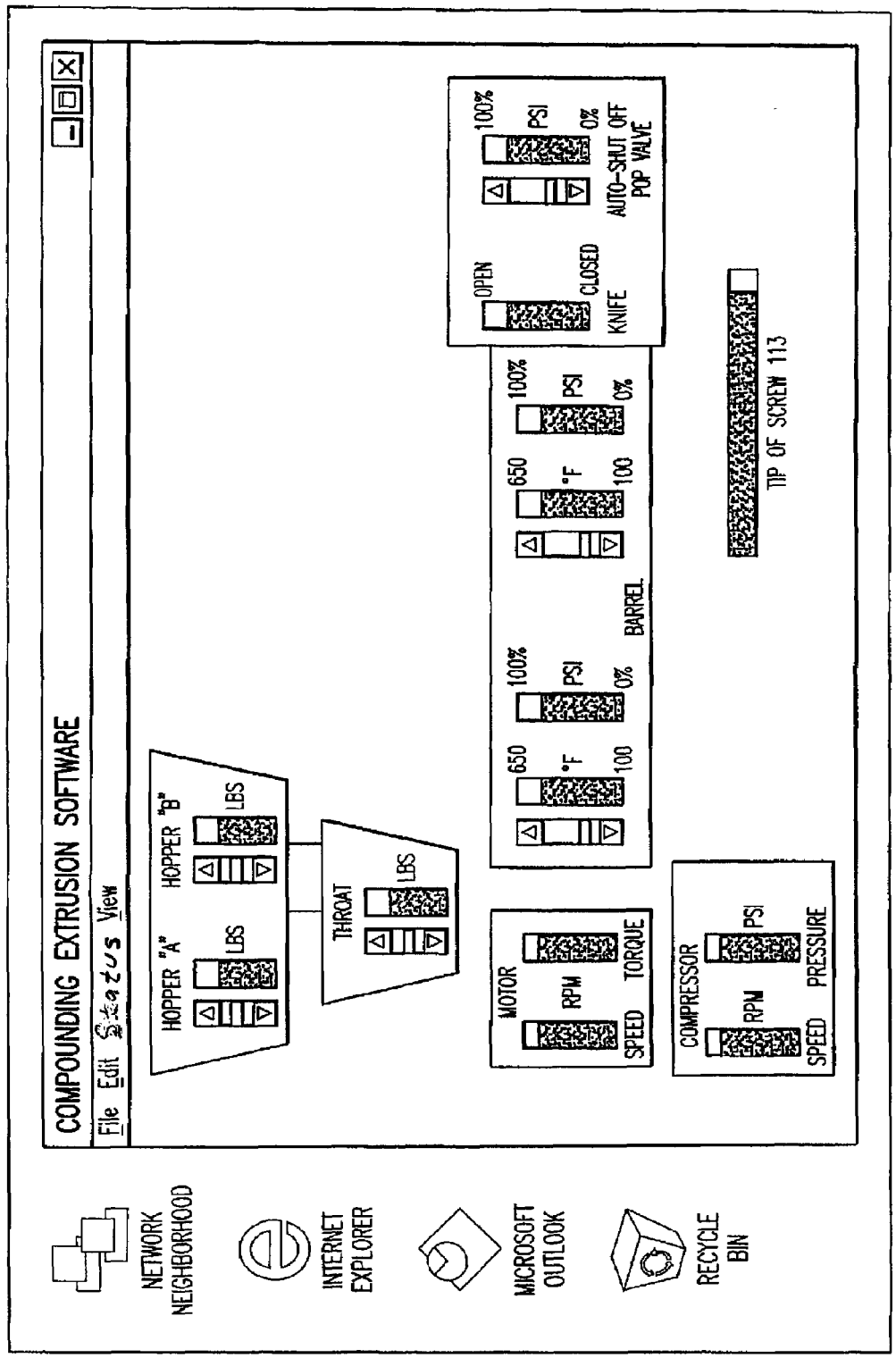
FIG. 11 is a graphical software representation of the physical characteristics and relationships of the present invention within a computer system.

The computer system 130 of the present invention can be ruggedized and located in close physical proximity to the extrusion system 102 and blending system 104, but can also be a standard non-ruggedized computer located elsewhere and communicating wirelessly with the extrusion and blending systems 102, 104. FIG. 11 shows a screen capture of a typical desktop computer displaying a visual representation of the extrusion, blending, and molding systems of the present invention. As shown in FIG. 11, the visual representation includes visual "graduated bar chart" style temperature and pressure indicators, and slider bars for the immediate visual adjustment thereof.

The software 1104 running on computer system 130 can prevent a user from implementing specific configurations of the extrusion and blending systems 102, 104 by outputting a warning that a certain barrel extension or sizing die must be added to achieve such a configuration. The software 1104 can also deny a user from implementing certain configurations by warning that the proposed settings conflict with existing barrel extension or sizing die attachments.

Figure 12:
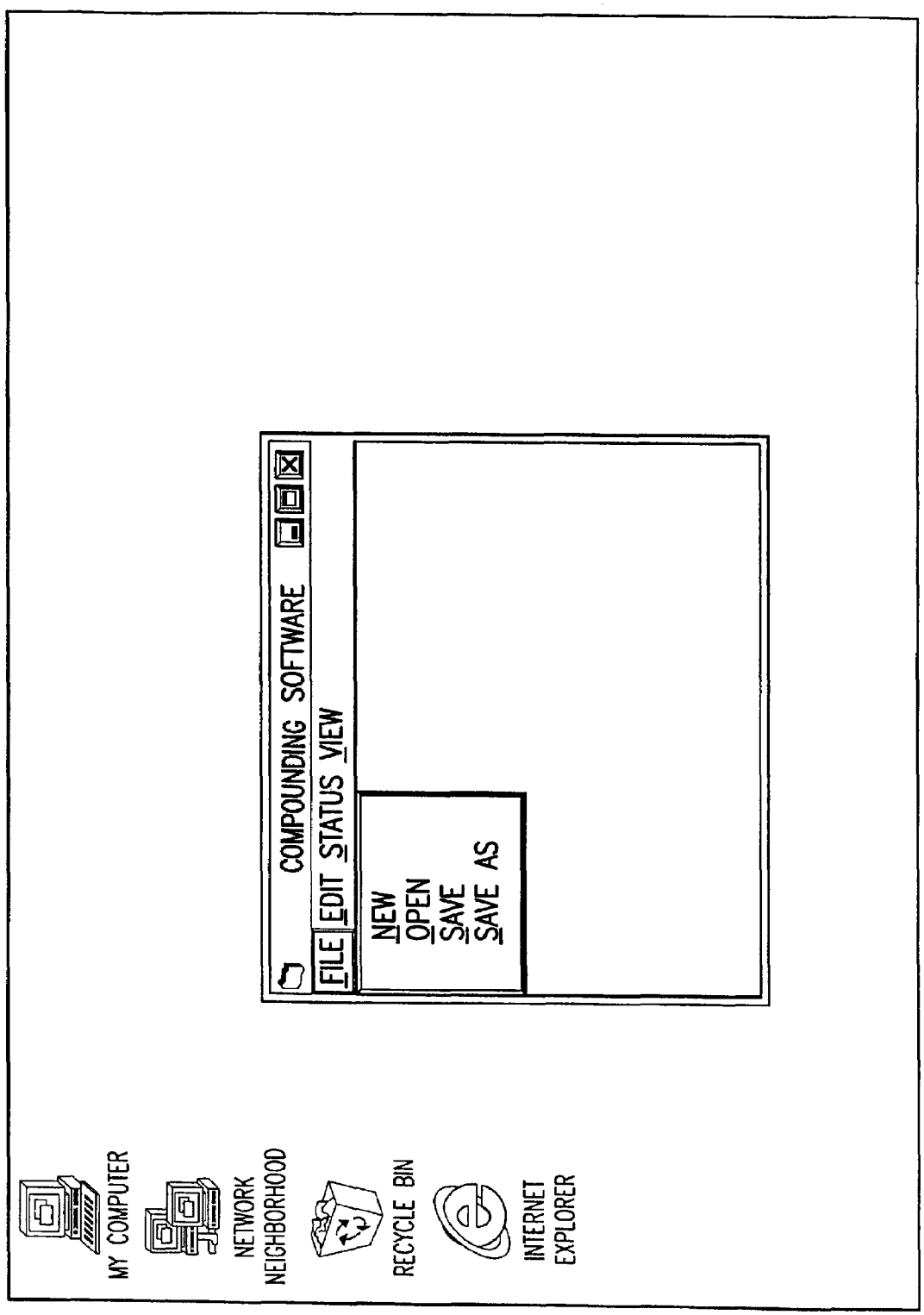
FIG. 12 shows pull down menus within the graphical software of FIG. 11.
Figure 13:
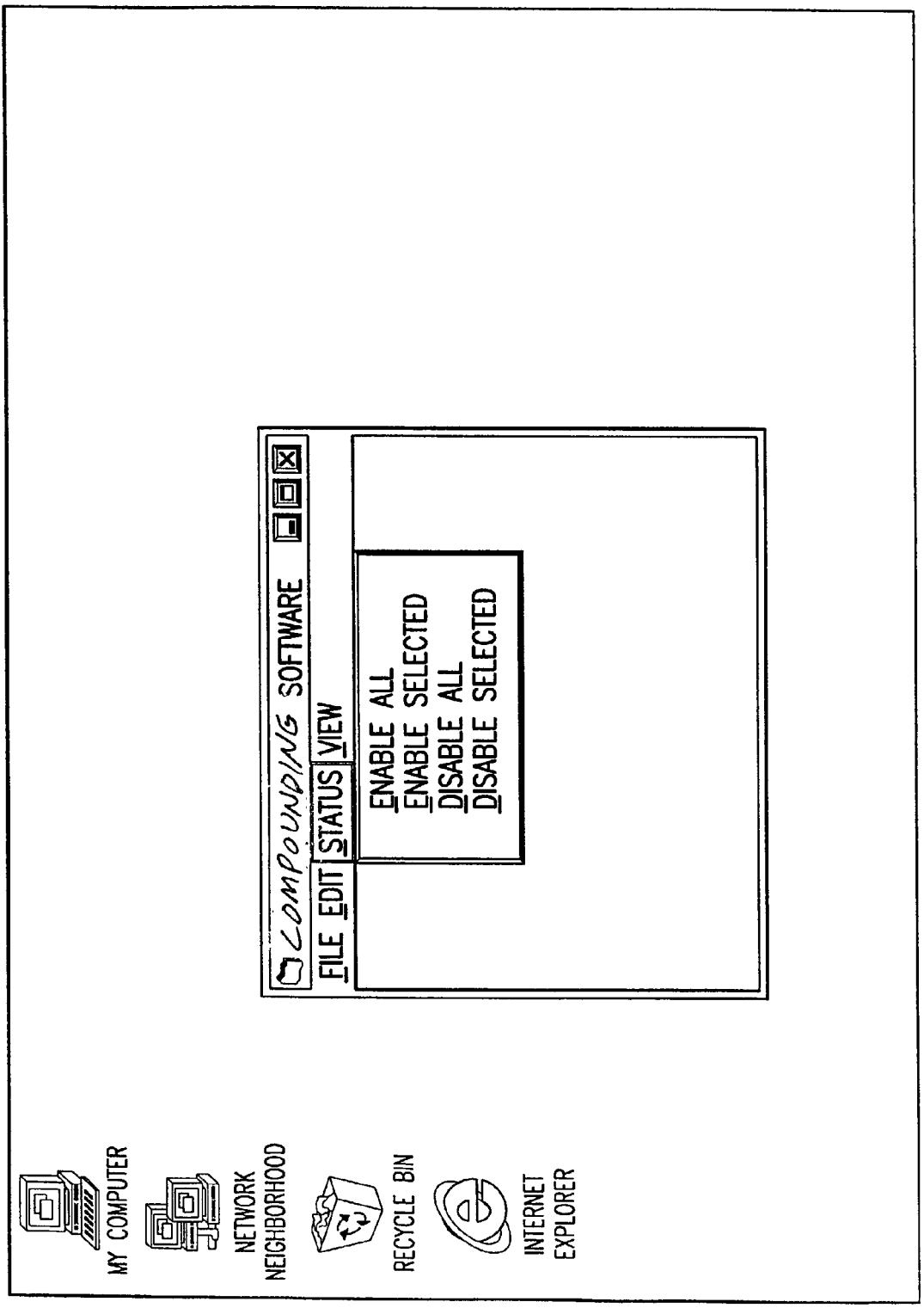
FIG. 13 shows additional pull down menus within the graphical software of FIG. 11.
Figure 14:
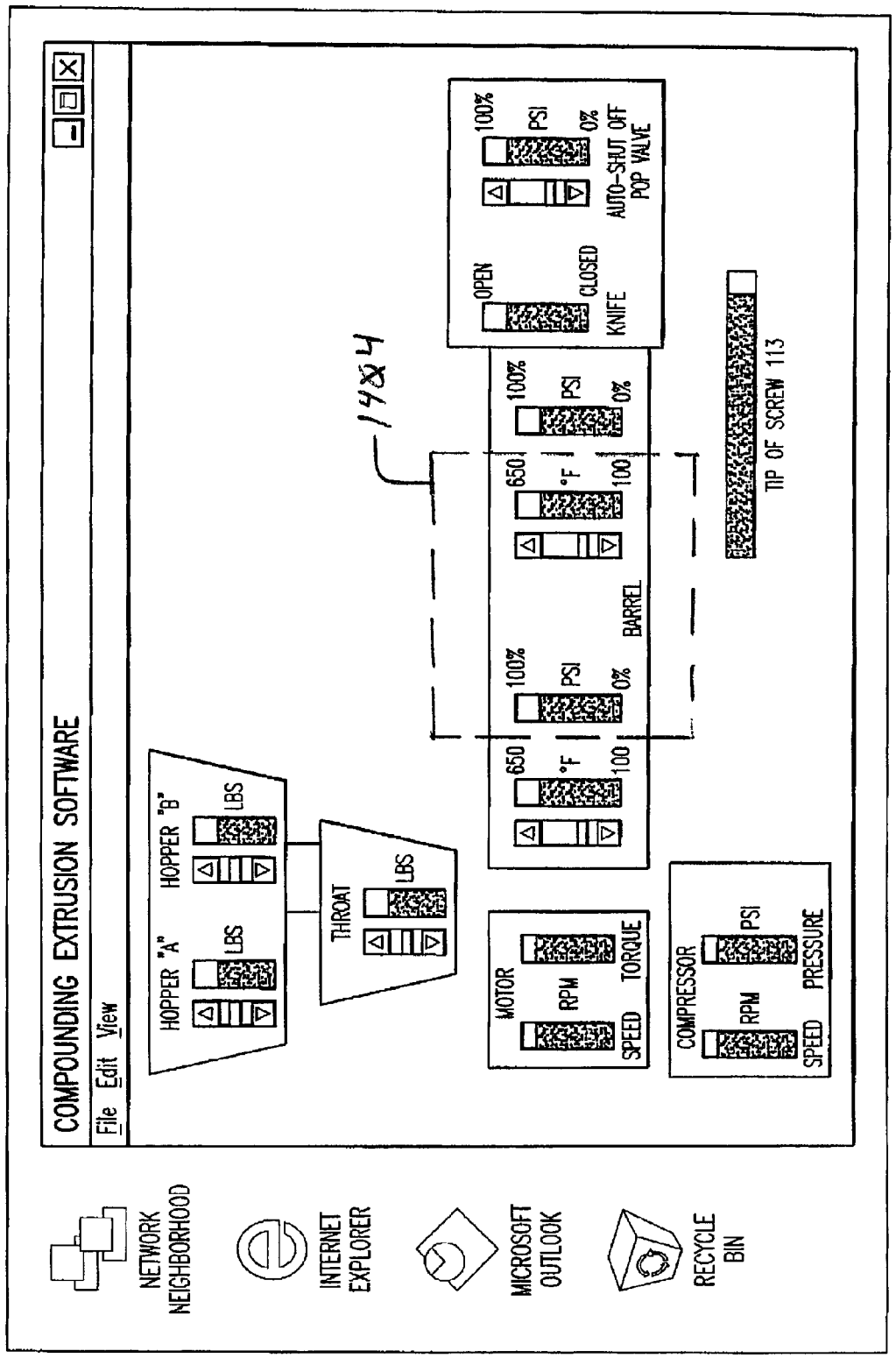
FIG. 14 is a representation of the select box used within the graphical software of FIG. 11.

Furthermore, the software 1104 can also operate in a "simulation" mode where a user can set up proposed hypothetical production runs in order to accommodate customer requests for estimates of time and costs. These profiles are stored and retrieved using the pull down menus shown in FIG. 12. Also, statistics from earlier production runs are logged into files which are also selectable using the pull down menus of the software 1104 shown in FIG. 12. The software 1104 can also be run from a browser environment. FIG. 13 shows pull down menus which allow for visually enabling/disabling the portions of the mechanism selected using a select box, as well as allowing for zoom-viewing of portions within the select box. FIG. 14 shows an exemplary use of a select box 1402 use in conjunction with the pull-down menus shown in FIG. 13. In FIG. 14, a portion 1404 of the barrel 114 is selected.

Additional features of computer system 130 include, in the event of a situation with either extrusion system 104, blending system 102, or molding system 140 requiring user intervention, an alert to a pager can be generated, and/or an urgent message to a user's or users' computer screens. This feature is possible whether the computer system 130 is in close physical proximity to the systems 104, 102, 140, or part of a non-vicinity offsite computer system. The computer system 130 could also post a message to a group of users, communicate through an instant messaging utility, or send an e-mail potentially with attachments showing the status of the parts of the various systems. Using the pull down menus shown in FIG. 13, the gravity, vibration, or cram feeders can be enabled/disabled while a load of charge 138 is being processed in the barrel 114. The software 1104 can also enable/disable feedback from various parts of invention while other parts of the invention are currently in operation, or are being cleaned or flushed.

A hand held device (such as a Palm Pilot) adaptation exists in which a hand held device wirelessly communicates with the extrusion, blending, and molding systems 102, 104, 140 and can make status queries and reconfigure an extrusion job. For those extrusion systems which utilize Programmable Logic Control (PLC), the hand held device can be loaded with a software module which facilitates rendering a user's manual input of job requirements into PLC instructions which can be interpreted and understood by the computer system 130.

Additionally, the visual controls described above can be precompiled into individual classes, and then can be rearranged to more accurately correspond to the physical configuration, such as that shown in FIG. 7. Such configurability and customization is made possible by advances in object oriented programming techniques. In particular, the ability to develop parent classes which can exercise inheritance and/or polymorphism with respect to the precompiled classes enables a user to configure and change objects whenever that user changes the physical configuration of any of the blending, extrusion, and molding systems 102, 104, and 140. Thus, a visual representation of a large system can be achieved that is intuitive and easy to use, but still represents the important electrical and mechanical characteristics of the blending, extrusion, and molding systems.

It is anticipated that various changes may be made in the arrangement and operation of the system of the present invention without departing from the spirit and scope of the invention, as defined by the following claims.

What is claimed is:

1. A compounding extruding and blending apparatus, comprising:
    a blending system comprising a closed-loop auger feeder, responsive to a computer system;
    wherein said blending system further comprises a vacuum loader and thermoplastic dryer, and includes dual paths which either incorporate or bypass said dryer and the choice of said paths can be made through said computer;
    an extrusion system for forming a charge from the output of said blending system, comprising a screw, barrel, and knife, said extrusion system also responsive to said computer system;
    wherein said extrusion system further comprises a low shear barrier screw inside a heated barrel, said screw being retractable and movable in both horizontal directions within said barrel and responsive to head pressure generated by a melt stream that is conveyed toward one end of said barrel against a knife, wherein said knife acts as a barrier to the flow of materials produced by the natural pumping action of said screw.

2. The apparatus of claim 1, wherein said extrusion system further comprises a barrel, motor, heater bands, and temperature sensors wherein said computer monitors and adjusts the speed and torque of said motor as well as monitors the temperature within said barrel using said sensors and adjusts the temperature within said barrel using said heater bands.

3. The apparatus of claim 1, wherein said blending system further comprises an specially designed elevator which eliminates clogging of glass materials inserted therein.

4. The apparatus of claim 3, wherein said glass materials have a neutral sizing coating prior to insertion into said blending system, and said sizing coating is rendered inert by said extrusion system.

5. The apparatus of claim 1, wherein said blending system further comprises slide gates for measuring resin and additive prior to insertion within said extrusion system, wherein said slide gates are responsive to said computer system.

6. The apparatus of claim 1, wherein said blending system further comprises an auger feeder and weigh pan, both responsive to said computer system.

7. The apparatus of claim 1, wherein said blending system further comprises an vibration feeder.

8. The apparatus of claim 1, wherein said blending system gravity feeds said extrusion system.

9. The apparatus of claim 1, wherein said blending system force feeds to said extrusion system.

10. The apparatus of claim 1, wherein said blending system alternates between gravity feeding and force feeding said extrusion system, and can instantaneously switch between either mode, or can operate in both modes simultaneously in embodiment wherein said auger feeder has multiple apertures.

11. The apparatus of claim 2, wherein said extrusion system further comprises a variable-pressure auto shut-off pop valve located on said screw, said auto shut-off pop valve being responsive to said computer system.

12. The apparatus of claim 11, wherein said extrusion system further comprises a preformer for processing said charge to prior to being input to a mold cavity.

13. The apparatus of claim 1, wherein said extrusion system further comprises two or more barrels each with a screw contained therein.

14. The apparatus of claim 11, wherein said sensors, barrel, auto shut-off pop valve, and knife can be temporarily removed and reattached from said extrusion system.

15. The apparatus of claim 1, wherein said sensors can be either wired to said computer system or communicating wirelessly with said computer system either directly or through a wireless IR relay link.

16. The apparatus of claim 15, wherein said sensors contain their own power cells and do not have wire leads.

17. The apparatus of claim 15, wherein said sensors are made from a material resistant to corrosive substances used to clean said extrusion system.

18. The apparatus of claim 15, wherein said knife is responsive to a pressure sensor which is in turn linked with said computer system so that the pressure which ultimately causes said screw to retract can be responsive to specific material characteristics desired by a user.

19. The apparatus of claim 1 wherein said compounding extrusion system is directly connected to a molding press.

20. The apparatus of claim 1 wherein said compounding extrusion system is connected to a molding press through a preforming device such as a sizing die.

21. The apparatus of claim 1 wherein said compounding extrusion system is connected to a pager system for notifying users of situations requiring user intervention.

22. The apparatus of claim 1 wherein said computer system posts a pop-up window, e-mail, or instant message on a user's office computer to a pager system for notifying users of situations requiring user intervention.

23. The apparatus of claim 1 wherein said compounding extrusion system is connected to a hand-held device which communicates through programmable logic controller connection.

24. The apparatus of claim 2 wherein said computer system comprises a visual user interface which maintains a visual representation of the operating status of said compounding extruding and blending apparatus, and is configurable to visually correspond to the physical organization of said apparatus and how said screw, barrel, knife, motor, heater bands, and temperature sensors are physically positioned with respect to each other;

wherein said visual user interface simultaneously represents the entire overall compounding extruding and blending apparatus and is configured to exactly correspond to the physical arrangement of said screw, barrel, knife, motor, heater bands, and temperature sensors;

and further wherein a user can view said overall compounding extruding and blending apparatus and immediately correlate specific components within said apparatus to portions of said visual user interface, and wherein a user can also view said visual user interface and immediately correlate said interface to specific components within said compounding extruding and blending apparatus.

* * * * *